United States Patent
Guday (10) Patent No.: US 8,243,022 B2
(45) Date of Patent: Aug. 14, 2012

(54) FEDERATED VIRTUAL GRAFFITI

(75) Inventor: Shai Guday, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1164 days.

(21) Appl. No.: 11/563,625

(22) Filed: Nov. 27, 2006

(65) Prior Publication Data

US 2008/0122871 A1 May 29, 2008

(51) Int. Cl.
*G09G 5/00* (2006.01)
*H04M 1/00* (2006.01)

(52) U.S. Cl. .................. 345/169; 345/1.1; 455/518
(58) Field of Classification Search .............. 345/156, 345/168–169, 1.1–1.3
See application file for complete search history.

(56) References Cited

U.S. PATENT DOCUMENTS

| | | | |
|---|---|---|---|
| 6,624,827 B1 | 9/2003 | Hwang et al. | |
| 6,681,107 B2 * | 1/2004 | Jenkins et al. | 455/412.1 |
| 6,809,843 B1 | 10/2004 | Youngers | |
| 6,879,835 B2 * | 4/2005 | Greene et al. | 455/456.1 |
| 6,976,220 B1 | 12/2005 | Lapstun et al. | |
| 7,048,318 B2 | 5/2006 | Weidow, III | |
| 7,363,024 B2 * | 4/2008 | Jenkins | 455/412.1 |
| 7,505,779 B1 * | 3/2009 | David | 455/518 |
| 7,853,296 B2 * | 12/2010 | Yu et al. | 455/566 |
| 7,881,864 B2 * | 2/2011 | Smith | 701/439 |
| 2003/0003956 A1 | 1/2003 | Maenpaa et al. | |
| 2003/0182168 A1 | 9/2003 | Lyons | |
| 2004/0165768 A1 | 8/2004 | Zhang et al. | |
| 2004/0221043 A1 | 11/2004 | Su et al. | |
| 2005/0099400 A1 | 5/2005 | Lee | |
| 2005/0104864 A1 | 5/2005 | Zhang et al. | |
| 2006/0179127 A1 * | 8/2006 | Randall | 709/219 |
| 2008/0147730 A1 | 6/2008 | Lee | |

OTHER PUBLICATIONS

Aliaga, et al., "A Collaborative Undergraduate Course for Pen-based Computing using Tablet PCs," http://www.itap.purdue.edu/tlt/conference/wipte/Papers/aliaga_daniel.pdf.
Berkowicz, et al., "eWhiteBoard: A Real Time Clinical Scheduler," http://adams.mgh.harvard.edu/PDF_Repository/D005823.PDF.
Farella, et al., "Multi-Client Cooperation and Wireless Pda Interaction in Immersive Virtual Environment," http://www-micrel.deis.unibo.it/~farella/doc/Farella115def.pdf.
Schilit, et al., "Context-Aware Communication," Date: Oct. 2002, http://ieeexplore.ieee.org/iel5/7742/22372/01043853.pdf?isNumber=.
Bill N. Schilit, Norman Adams, and Roy Want; Context-Aware Computing Applications, Abstract; Dec. 8-9, 1994.
Toshiba; Toshiba Recommends Microsoft® Windows® XP Professional; www.toshiba.co.uk/education.

* cited by examiner

*Primary Examiner* — Duc Dinh
(74) *Attorney, Agent, or Firm* — L. Alan Collins; Collins & Collins Intellectual, LLC (57) ABSTRACT

Technologies for creating and viewing virtual graffiti using federated devices. The technologies allow users to associate virtual graffiti with geographic locations and restrict access to the graffiti to particular users, groups, federations, or the like. Users with appropriate access rights may be able to discover and view graffiti associated with a particular geographic location via a federated device when they are present at the location. Users may also access such graffiti from lists via federated devices.

17 Claims, 4 Drawing Sheets

FEDERATED VIRTUAL GRAFFITI

BACKGROUND

Graffiti as is common in human society is enjoyed by some and considered a problem by others. Some find graffiti an art form and a means of communication. Others consider it a defacement of property and a nuisance at best. Even so, graffiti may be useful in certain circumstances and could be of greater value in a virtual form where only those authorized can view it.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for creating and viewing virtual graffiti using federated devices. The technologies allow users to associate virtual graffiti with geographic locations and restrict access to the graffiti to particular users, groups, federations, or the like. Users with appropriate access rights may be able to discover and view graffiti associated with a particular geographic location via a federated device when they are present at the location. Users may also access such graffiti from lists via federated devices.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the environment described is provided as an example and not a limitation. As those skilled in the art will appreciate, the present examples are suitable for application in a variety of different types of computing and communications environments.

Figure 1:
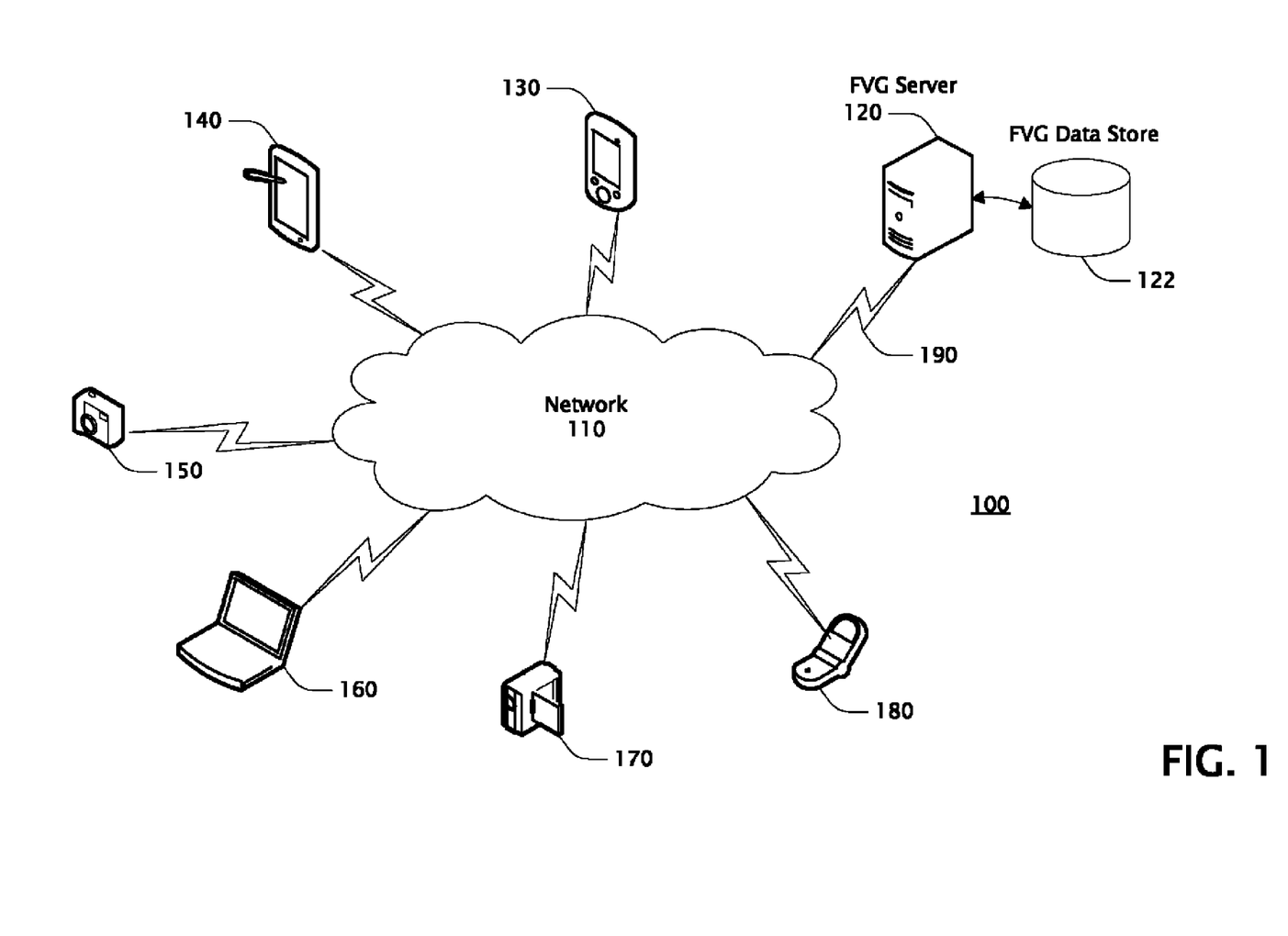
FIG. 1 is a block diagram showing example mobile devices coupled together via a network and to a federated virtual graffiti ("FGV") server and database or FVG data store.

FIG. 1 is a block diagram showing example mobile devices coupled together via a network 110 and to a federated virtual graffiti ("FGV") server 120 and database or FVG data store 122. Example devices may include personal data assistant ("PDA") 130, tablet personal computer ("PC") 140, digital camera 150, laptop PC 160, digital video recorder ("DVR") 170, and cell phone 180. Such devices may be operable to at least determine their physical location. Some such devices may include an example computing environment such as that described in connection with FIG. 4. Many other types of devices may also be coupled with the forgoing devices via network 110 or other means. Such devices may include mobile devices or other devices such as desktop PCs, servers, systems, or any other type of mobile or non-mobile device that may contribute to and/or benefit from virtual graffiti, Further examples of such devices include vehicles or any other device, system, construct, composition, or the like operable to at least recognize and/or support virtual graffiti information.

Devices may be coupled to network 110 via any operable link, such as example link 190. Such links may include a network interface card ("NIC"), a serial or parallel port, a data bus, an analog interface, or the like, may be wired or wireless, may make use of infrared ("IR"), acoustics, optics, radios frequency ("RF"), or the like. Network 110 may be an ad-hoc network with mobile devices coupling transiently. Server devices, such as server 120, and other non- or less-mobile devices, may be coupled to network 110 more persistently than mobile devices. In one example, network 110 may be a wireless fidelity ("Wi-Fi") network at a municipal facility, coffee shop, city library, courtroom, or airport lounge, or may be deployed across a neighborhood, city, county or other area. Mobile and other devices may typically link to such a Wi-Fi network via wireless adapters or any other suitable means. Such devices may also be operable to link to other types of networks. In another example, cell phones may link to a cellular network via appropriate RF adapters and protocols or other suitable means. Such cell phones may also be operable to link to other types of networks, such as Wi-Fi networks or the like. Network coupled devices may form and/or join federations of devices.

FVG server 120 may send and receive virtual graffiti information to other devices coupled to network 110, may process such virtual graffiti information, and may send such information to other devices coupled to network 110. FVG data store 122 may be utilized by FVG server 120 to store virtual graffiti data or the like including such received from various devices coupled to network 110 or otherwise coupled. In one example, FVG server 120 and database 122 may be an FVG appliance—a special-purpose device or system or the like primarily intended to provide FVG server and/or database functionality. Such an FVG appliance may be coupled to network 110 via any operable link, such as example link 190. Alternatively, a FVG appliance may provide a subset of FVG server and/or database functionality and/or may not be coupled to a network. Such an appliance may simply emit FVG information via RF means or acoustic means or the like.

Figure 2:
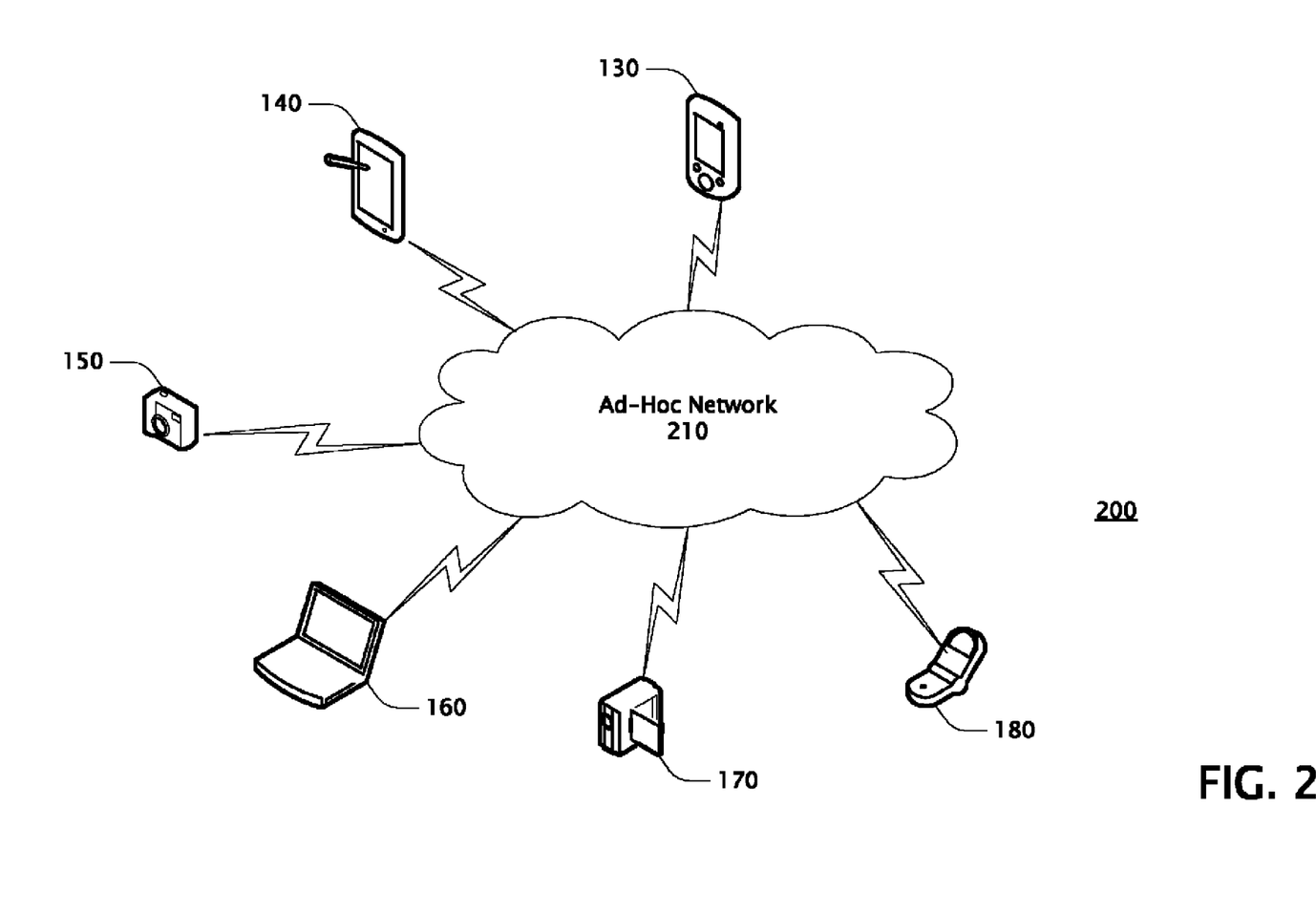
FIG. 2 is a block diagram showing example mobile devices coupled together via an ad-hoc network.

FIG. 2 is a block diagram showing example mobile devices coupled together via an ad-hoc network 210. Such an ad-hoc network may not include any persistent devices such as FVG servers or related data stores. Ad-hoc networks for FVG purposes may be formed as various mobile or other devices dynamically form and join such networks. For example, an ad-hoc network may be formed comprising devices of people on a particular bus or in a particular office, building, or area. In another example, such an ad-hoc network may be formed comprising devices carried by members of a particular family and perhaps their friends, by members of a club, group, association, or the like, by employees of a company, etc. Example devices shown in FIG. 2 include those described in connection with FIG. 1. Such an ad-hoc network may make use of the Internet, a corporate network, or any other type of network or combination of networks or the like, and devices coupled to such an ad-hoc network be separated by vast physical distances. Ad-hoc network coupled devices may form and/or join federations of devices.

The term "federation of devices" is generally intended to mean a grouping, collection, partnership, association, coalition, or the like of devices such that the devices may collaborate, interact, communicate, or the like via some means and for some purpose. In particular, a federation of such devices may interact for virtual graffiti purposes. A "federated device" is generally a device that is part of a federation of devices. Such as device may federate with other devices briefly or for a longer period of time. A federation of devices may be established via some formal means or via some ad-hoc means. The devices of such a federation of devices may collaborate, interact, communicate, or the like via a means such as a network, ad-hoc network, virtual network, RF transmissions, acoustics, IR, any other suitable means, or any combination of the foregoing.

A common example of traditional graffiti includes words or symbols painted on a wall. Virtual graffiti, as used herein, is similar in concept to traditional graffiti, but it exists only electronically as part of an FVG system or the like. Such virtual graffiti may include any type of graphics, text, audio, video, programs, applications, command links, or the like, or any other type of electronic data. In an FVG system, such data is typically associated with one or more geographic locations thus forming virtual graffiti. Virtual graffiti is typically not visible on an actual wall, for example, but may be visible via a mobile device, or other device including a display device, located at or near the actual wall. Only those with access rights to the virtual graffiti may view or modify or the like such virtual graffiti.

Virtual graffiti may be created and viewed much like traditional graffiti, except that virtual graffiti is created and viewed via devices such as those described in connection with FIGS. 1 and 2. For example, Mary may learn that his friend Tom is having a party at his house on Friday night. Mary may use her mobile device to create virtual graffiti associated with Tom's house indicating the party plans. For example, Mary, while at Tom's house, may create graffiti on her cell FVG-enabled phone that says, "Party Here Friday Night!" and make the graffiti available to all her friends. Then any of Mary's friends (with their FVG-enabled devices) passing by Tom's house would become aware of the graffiti associated with the house and be able to view it, thus becoming aware of the planned party.

In another example, Adam is a newspaper delivery boy who is leaving on vacation and who is having his friend Sue take over his route while he is away. The newspaper office uses an FVG system to identify the homes of its customers, including route information. Using an FVG-enabled PDA, Adam is able to tell which houses subscribe to the newspaper on his route via an audio "Subscriber!" indication when at each subscriber house. Adam lends his PDA to Sue who can, through the use of the FVG-enabled PDA, quickly and accurately tell to which homes she should deliver a newspaper. And if a new customer should be added while Adam is away, the office automatically updates the FVG system such that Sue will become aware of the new customer the next time she delivers.

In yet another example, an advertiser may make use of an FVG system to create advertisement graffiti that is configured to be viewable at the beginning of a sale through the end of the sale. For example, an auto maker may create such a virtual graffiti advertisement for a particular model of car, the advertisement graffiti configured to be viewable, staring the day of the sale and continuing until the end of the sale, by any user of an FVG system when such a user is at or near any of the car maker's dealers. Further, such advertisers may pay owners of various networks and/or federations to advertise using virtual graffiti on their networks and/or federations.

Figure 3:
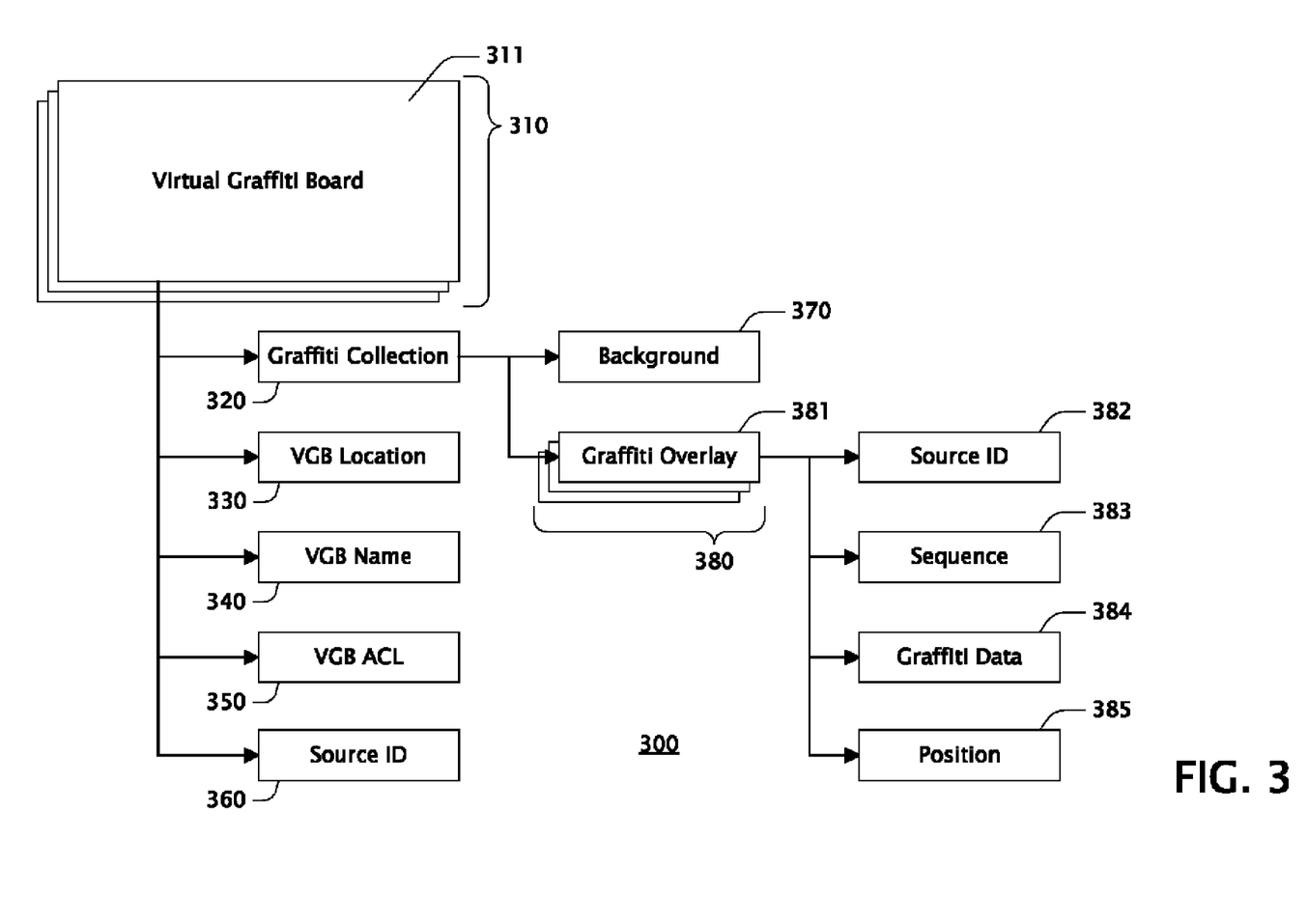
FIG. 3 is a block diagram showing an example of a virtual graffiti board ("VGB") structure.

FIG. 3 is a block diagram showing an example of a virtual graffiti board ("VGB") structure 300. Such an example VGB structure may be used in conjunction with a device, such as a mobile device, for federated virtual graffiti purposes. For example, a person carrying a PDA including picture taking capability may enjoy lunch at a restaurant and desire to leave some "graffiti" indicating such for his friends and family. This person, Bob, may use his PDA to snap a picture of the front of the restaurant and then scribble "Great lunch joint!" over the picture, and then associate it with a federation used by his friends and family. The next time one of Bob's friends or family walk by the same restaurant with their federated mobile device, the device may issue an audible alert or the like indicating the graffiti associated with the restaurant and causing the friend/family to look and see the picture with the "Great lunch joint" graffiti scribbled over it.

A user of an FVG system, such as Bob in the restaurant example above, may define or create a set of one or more VGBs 310. In the restaurant example, Bob created one VGB for the restaurant graffiti. Each VGB in set 310, such as example VGB 311, typically includes several data elements, such as example elements 320-385, that at least partially define the VGB and its functionality. VGB 310 is typically provides for the creation of virtual graffiti and/or the viewing or rendering of virtual graffiti. For example, in associated with a device, virtual graffiti in the form of text, graphics, an image, or the like may be viewed via VGB 310 while virtual graffiti in the form of audio may be rendered via VGB 310.

Graffiti collection element 320 typically includes the graffiti data associated with a particular VGB, such as VGB 311. Example graffiti data may include background 370 and a set of one or more graffiti overlays 380. In the restaurant example above, the background is the picture of the front of the restaurant that Bob took. In alternate examples, the background may be a web page or the like, a video, a simple black, white, or colored background, any other type of background, or any combination of the foregoing. In the restaurant example above, the graffiti overlay, such as overlay 381, includes the scribbled phrase "Great lunch joint!"

In another example, background 370 may be an image of a physical topology or the like such that, via a device, a user can view the image of a physical surrounding while also seeing the virtual graffiti overlay on top of it. For example, a user may view a physical surrounding through an FVG-enabled digital camera's viewfinder and also see any associated virtual graffiti.

A graffiti collection, such as collection 320, typically includes a set of one or more graffiti overlays 380. Each graffiti overlay in set 380, such as example overlay 381, typically includes several data elements, such as source ID 382, sequence 383, graffiti data 384, and position 385. In other examples, different or other data elements may be included. The acronym "ID" as used herein with source ID and other terms means "identifier".

Source ID 382 typically identifies the source of, or the user who created, a particular graffiti overlay, such as overlay 381. In the restaurant example above, source ID 382 would identify the user Bob. The format and/or structure of source ID 382 may be any suitable for identifying such a user, which may be a person or a system, device, or the like. In one example, source ID 382 may be a user account ID for a federation, such as the federation used by Bob's friends and family.

Sequence 383 typically identifies the sequencing, ordering, creation time, or the like of its associated graffiti overlay, such as overlay 381. The format and/or structure of sequence 383 may be any suitable for identifying the sequence of a graffiti overlay in a set of overlays, such as graffiti overlay 381 in set 380. In one example, sequence 383 may be a date/time stamp. In another example, sequence 383 may be a sequence number such as an integer. In the restaurant example above, the "Great lunch joint!" overlay is the first and only overlay and thus sequence 383 would indicate such.

Graffiti data 384 typically represents the graffiti that is created by or may become visible to a user of the FVG system. In the restaurant example above, graffiti data 384 defines the scribbled phrase "Great lunch joint!" The format and/or structure of graffiti data 384 may be any suitable for defining the graffiti of a graffiti overlay in a set of overlays, such as graffiti overlay 381 in set 380. In one example, graffiti data 384 is a text string. In alternate examples, graffiti data 384 may include a graphical image, a picture, audio data, video data, a web page or the like, a universal resource locator ("URL") or hotlink or the like, a program, a command, or any combination of the foregoing. Graffiti data 384 may also include any other data or metadata useful for rendering or displaying the defined graffiti.

Position 385 typically identifies the location on background 370 at which the graffiti defined by graffiti data 384 is rendered or displayed. For example, in the restaurant example above, Bob's intention may have been to make it appear as though he had scribbled the phrase "Great lunch joint!" on the front door of the restaurant. Position 385 includes data such that when the VGB is displayed, the scribbled phrase is properly positioned, such as over the door in the restaurant example. The format and/or structure of position 385 may be any suitable for identifying the location on background 370 of a graffiti overlay in a set of overlays, such as graffiti overlay 381 in set 380. In some instances, position 385 may not be used, such as when graffiti data 384 defines audio graffiti or the like.

VGB location 330 typically indicates a geographic location for an associated VGB. In one example, VGB location 330 includes physical location data. In the restaurant example above, VGB location 330 indicates the geographic front of the restaurant in terms of latitude, longitude and altitude. Examples of physical location data include global positioning system ("GPS") data, triangulation data, location transponder data, or the like, or any combination of the forgoing. The format and/or structure of VGB location 330 may be any suitable for including physical location data and/or identifying the geographic location associated with a VGB in a set of VGBs, such as VGB 311 in set 310.

VGB location 330 may also include information specifying a "hit range"—that is, a proximity to the geographic or physical location indicated by VGB location 330 within which one is considered to be "at" the geographic location indicated. Such a hit range may be specified as part of an FVG system, as part of VGB location element 330, as part of a location tracking system, such as a GPS system, or may be specified via any other suitable manner, or combination of the foregoing. In the restaurant example above, the hit range may specify proximity of some number or feet or yards of the geographic front of the restaurant recorded in terms of latitude, longitude and altitude. Such hit range proximity values may be automatically created by a FVG system, may be established by default, may be user-provided via a suitable interface, or the like.

VGB location 330 is typically used to identify the geographic location of a VGB when it is created, as well as indicate the geographic location where the VGB and any associated virtual graffiti is available to users of the FVG system. In the restaurant example above, VGB location 330 indicates the front of the restaurant. Such location information may indicate geographic location with varying degrees of accuracy. Location 330 also serves to indicate to users of the FVG system who are part of Bob's friends and family federation that graffiti is available at the location of the front of the restaurant. Such an indication may occur when a friend walks by the restaurant with his federated mobile device, or when a friend is searching for graffiti associated with restaurants on his federated mobile device.

Alternatively, VGB location 330 may be a used to identify multiple geographic locations based on a location description. For example, VGB location 330 may include information identifying "McDonald's Restaurants." Such information may be used in conjunction with location mapping means to make an associated VGB available at or near any McDonald's restaurant. Other such examples include defining VGB location 330 to indicate the location of any instance of a class of locations, such as any store that is an Albertson's store, any facility that is a Microsoft facility, any building that is a government building, any home to which a newspaper of a particular publisher is delivered, or the like. Various location mapping means may be utilized to identify the location of such locations or instances of classes of locations.

In yet another alternative, VGB location 330 may be used to identify the location of a mobile entity or any instance of a class of entities. For example, VGB location 330 may include information identifying a specific taxi cab. Such information may be used in conjunction with sufficient location mapping means to make an associated VGB available to users at or near the specific taxi cab, regardless of where the taxi cab happens to be located. Other examples include defining VGB location 330 to indicate the current location of any mobile entity, such as any person, animal, package, or any other object or entity wherein that entity includes sufficient location tracking and communication means. Further, VGB location 330 may be defined to indicate the current location of one or more instances of a class of entities, such as any employee of a particular company, any vehicle in a particular organization's fleet of vehicles, any package shipped from a particular source, or any other object or entity wherein the instances of a class of entities include sufficient location tracking and communication means. Various location tracking and communication means may be utilized to identify the location of such instances of various classes of entities.

VGB name 340 typically indicates a name, title, description or the like associated with a VGB. In the restaurant example above, Bob names the VGB "Guido's of Seattle" which happens to be the name of the restaurant. Such a name may be utilized by an FVG system to form lists of VGB names that can be browsed and selected by users of the system, for example. The format and/or structure of VGB name 340 may be any suitable for identifying the name associated with a VGB in a set of VGBs, such as VGB 311 in set 310.

VGB access control list ("ACL") 350 typically controls access to a particular VGB in a set of VGBs, such as VGB 311 in set 310. In the restaurant example above, Bob sets VBG ACL 350 such that only those that are part of his friends and family federation can access the "Guido's of Seattle" VGB including the scribbled virtual graffiti phrase "Great lunch joint!" The format and/or structure of VGB ACL 350 may be any suitable for identifying entities with access rights to a VGB in a set of VGBs, such as VGB 311 in set 310. Such entities may be users, groups, members of federations, or any other type of identifier useful in maintaining access control to a VGB. VGB ACL 350 typically supports multiple identifiers. For example, VGB ACL 350 may support a number of IDs for individual users as well as IDs for federations and/or groups or the like, typically indicating that any member or user of such a federation or group is authorized to access the associated VGB. VGB ACL 350 may also control access to a VGB for actions other than viewing a VGB, such as the ability to create, modify and/or delete a VGB. Further, VGB ACL 350 may also be used to control access to information about a VGB and/or any of its associated data, thus providing some degree of security and/or privacy via sufficient security and privacy means.

Source ID 360 typically identifies the creator or owner of a VGB in a set of VGBs, such as VGB 311 in set 310. In the restaurant example above, source ID 360 may include an ID for Bob, indicating that Bob is the creator and owner of the VGB. The format and/or structure of source ID 350 may be any suitable for identifying the creator or owner of a VGB in a set of VGBs, such as VGB 311 in set 310.

Figure 4:
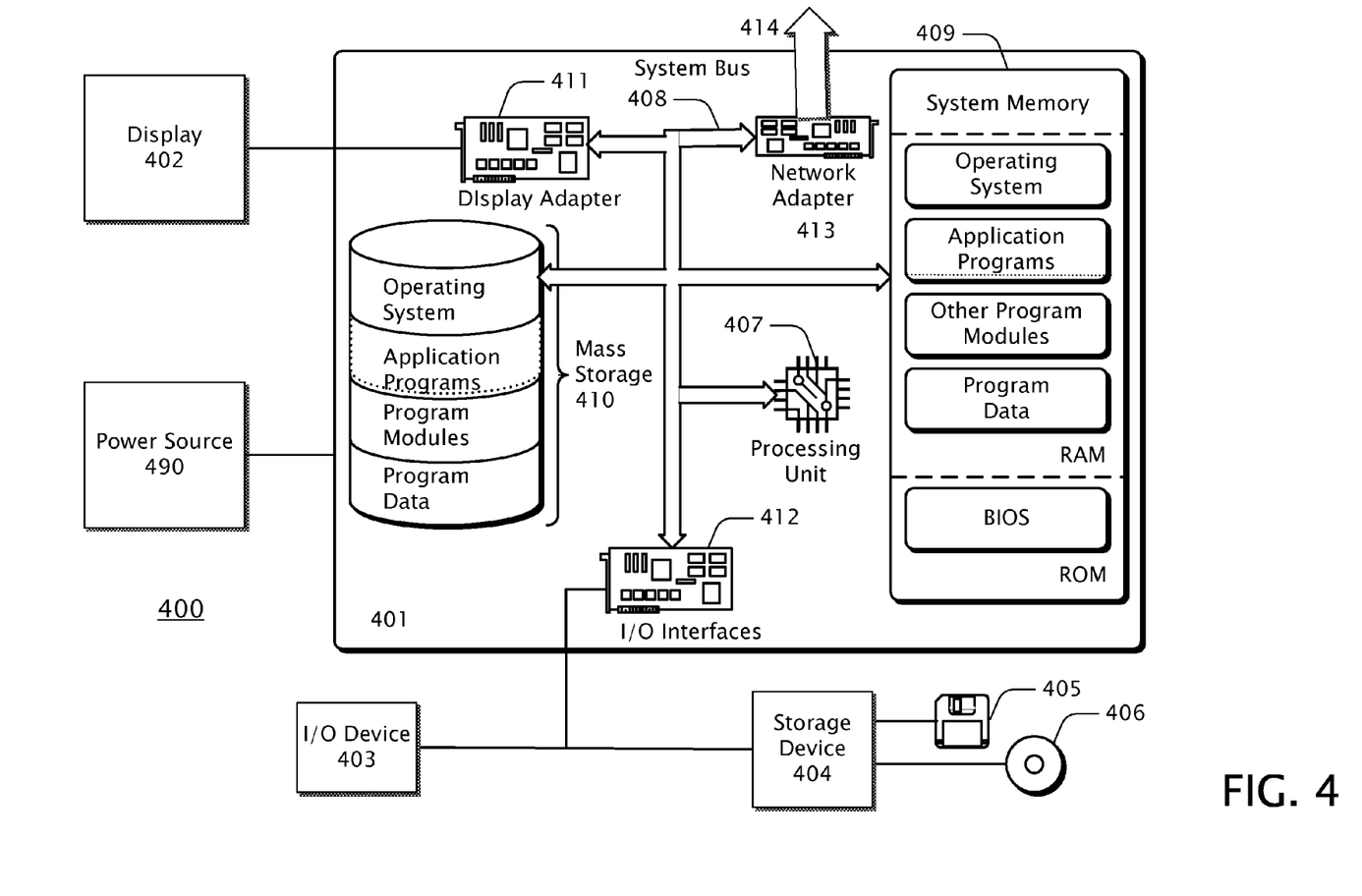
FIG. 4 is a block diagram showing an example computing environment in which the technologies described above may, at least in part, be implemented.

FIG. 4 is a block diagram showing an example computing environment 400 in which the technologies described above may, at least in part, be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 400 typically includes a general-purpose computing system in the form of a computing device 401 coupled to various components, such as peripheral devices 402, 403, 404 and the like. System 400 may couple to various other components, such as input devices 403, including voice recognition, touch pads, buttons, keyboards and/or pointing devices, such as a mouse or trackball, via one or more input/output ("I/O") interfaces 412. The components of computing device 401 may include one or more processors (including central processing units ("CPU"), graphics processing units ("GPU"), microprocessors ("µP"), and the like) 407, system memory 409, and a system bus 408 that typically couples the various components. Processor 407 typically processes or executes various computer-executable instructions to control the operation of computing device 401 and to communicate with other electronic and/or computing devices, systems or environment (not shown) via various communications connections such as a network connection 414 or the like. System bus 408 represents any number of several types of bus structures, including a memory bus or memory controller, a peripheral bus, a serial bus, an accelerated graphics port, a processor or local bus using any of a variety of bus architectures, and the like.

System memory 409 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 409 typically stores data, computer-executable instructions and/or program modules comprising computer-executable instructions that are immediately accessible to and/or presently operated on by one or more of the processors 407.

Mass storage devices 404 and 410 may be coupled to computing device 401 or incorporated into computing device 401 via coupling to the system bus. Such mass storage devices 404 and 410 may include non-volatile RAM, a magnetic disk drive which reads from and/or writes to a removable, non-volatile magnetic disk (e.g., a "floppy disk") 405, and/or an optical disk drive that reads from and/or writes to a non-volatile optical disk such as a CD ROM, DVD ROM 406. Alternatively, a mass storage device, such as hard disk 410, may include non-removable storage medium. Other mass storage devices may include memory cards, memory sticks, tape storage devices, and the like.

Any number of computer programs, files, data structures, and the like may be stored in mass storage 410, other storage devices 404, 405, 406 and system memory 409 (typically limited by available space) including, by way of example and not limitation, operating systems, application programs, data files, directory structures, computer-executable instructions, and the like.

Output components or devices, such as display device 402, may be coupled to computing device 401, typically via an interface such as display adapter 411. Output device 402 may be a liquid crystal display ("LCD"). Other example output devices may include printers, audio outputs, voice outputs, cathode ray tube ("CRT") displays, tactile devices or other sensory output mechanisms, or the like. Output devices may enable computing device 401 to interact with human operators or other machines, systems, computing environments, or the like. A user may interface with computing environment 400 via any number of different I/O devices 403 such as a touch pad, buttons, keyboard, mouse, joystick, game pad, data port, and the like. These and other I/O devices may be coupled to processor 407 via I/O interfaces 412 which may be coupled to system bus 408, and/or may be coupled by other interfaces and bus structures, such as a parallel port, game port, universal serial bus ("USB"), fire wire, infrared ("IR") port, and the like.

Computing device 401 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 401 may be coupled to a network via network adapter 413 or the like, or, alternatively, via a modem, digital subscriber line ("DSL") link, integrated services digital network ("ISDN") link, Internet link, wireless link, or the like.

Communications connection 414, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 490, such as a battery or a power supply, typically provides power for portions or all of computing environment 400. In the case of the computing environment 400 being a mobile device or portable device or the like, power source 490 may be a battery. Alternatively, in the case computing environment 400 is a desktop computer or server or the like, power source 490 may be a power supply designed to connect to an alternating current ("AC") source, such as via a wall outlet.

Some mobile devices may not include many of the components described in connection with FIG. 4. For example, an electronic badge may be comprised of a coil of wire along with a simple processing unit 407 or the like, the coil configured to act as power source 490 when in proximity to a card reader device or the like. Such a coil may also be configure to act as an antenna coupled to the processing unit 407 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 402, I/O device 403, or many of the other components described in connection with FIG. 4. Other mobile devices that may not include many of the components described in connection with FIG. 4, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A federated virtual graffiti system comprising:
a first mobile device of a plurality of mobile devices coupled together in an ad-hoc network that is dynamically formed by the plurality of mobile devices resulting in a federation of devices comprising the plurality of mobile devices and the ad-hoc network;
a virtual graffiti board implemented on the first mobile device and configured to enable a first user to create virtual graffiti via the first mobile device and to associate the virtual graffiti with a geographical location via the first mobile device, the virtual graffiti comprising electronic data configured to include graphics, audio, and video;
a graffiti collection element of the virtual graffiti board that is configured to define the virtual graffiti to include a background and at least one graffiti overlay, the graffiti collection element comprising a background element configured to define the background for the virtual graffiti and a graffiti overlay element configured to define at least a portion of the virtual graffiti, the graffiti overlay element comprising a source identifier that identifies a creator of the graffiti overlay element, a sequence element that identifies a position over the graffiti overlay element in a set of graffiti overlay elements, and a position element that indicates a position of the graffiti overlay element on a background of the virtual graffiti; and
a location element of the virtual graffiti board that is configured to store on a storage device of the first mobile device information indicating the geographic location associated with the virtual graffiti and a hit range that specifies a proximity to the geographic location, the virtual graffiti board further configured to provide the virtual graffiti to a second user via a second mobile device of the federation of devices in response to the second mobile device entering the hit range.

2. The system of claim 1 wherein the virtual graffiti board is one of a set of virtual graffiti boards.

3. The system of claim 1 wherein the graffiti overlay element is one of a set of graffiti overlay elements.

4. The system of claim 1 wherein the background is an image.

5. The system of claim 1 wherein the graffiti overlay element includes a graffiti data element that defines at least a portion of the virtual graffiti.

6. The system of claim 5 wherein the graffiti data element includes text data.

7. The system of claim 5 wherein the graffiti data element includes audio data.

8. The system of claim 5 wherein the graffiti data element includes video data.

9. The system of claim 5 wherein the graffiti data element includes a program or a link to a program.

10. A virtual graffiti system comprising:
a virtual graffiti board configured to include virtual graffiti that is associated with a geographic location and that is created by a first user via a first mobile device of a plurality of mobile devices coupled together in an ad-hoc network that is dynamically formed by the plurality of mobile devices resulting in a federation of devices comprising the plurality of mobile devices and the ad-hoc network, the virtual graffiti comprising electronic data configured to include graphics, audio, and video, the virtual graffiti board implemented on the first mobile device;
a graffiti collection element of the virtual graffiti board that is configured to define the virtual graffiti to include the background and at least one graffiti overlay, the graffiti collection element comprising a background element configured to define the background for the virtual graffiti and a graffiti overlay element configured to define at least a portion of the virtual graffiti, the graffiti overlay element comprising a source identifier that identifies a creator of the graffiti overlay element, a sequence element that identifies a position over the graffiti overlay element in a set of graffiti overlay elements, and a position element that indicates a position of the graffiti overlay element on a background of the virtual graffiti; and a location element configured to store on a storage device of the first mobile device information indicating the geographic location related to the virtual graffiti and a hit range that specifies a proximity to the geographic location, wherein the virtual graffiti board is configured to provide the virtual graffiti to a second user via a second mobile device of the plurality of mobile devices in response to the second mobile device entering the hit range.

11. The system of claim 10 wherein the location element includes information indicating a geographic location for any instance of a class of locations.

12. The system of claim 10 wherein the location element includes information indicating a geographic location for any instance of a class of entities.

13. The system of claim 12 wherein one or more entities of the class of entities are mobile entities.

14. The system of claim 10 wherein the location information includes a hit range.

15. A virtual graffiti system comprising:
a first mobile device of a plurality of mobile devices coupled together in an ad-hoc network that is dynamically formed by the plurality of mobile devices resulting in a federation of devices comprising the plurality of mobile devices and the ad-hoc network;

a set of virtual graffiti boards implemented on the first mobile device;

a graffiti collection element configured to define virtual graffiti to include a background and at least one graffiti overlay, the virtual graffiti associated with one of the set of graffiti boards, the graffiti collection element comprising a background element configured to define the background and a graffiti overlay element configured to define at least a portion of the virtual graffiti, the graffiti overlay element comprising a source identifier that identifies a creator of the graffiti overlay element, a sequence element that identifies a position over the graffiti overlay element in a set of graffiti overlay elements, and a position element that indicates a position of the graffiti overlay element on a background of the virtual graffiti; and a location element associated with the one of the virtual graffiti boards and configured to provide the virtual graffiti to a user via a mobile device of the federation of devices in response to the mobile device entering the hit range that specifies a proximity to the geographic location associated with the virtual graffiti, the virtual graffiti comprising electronic data configured to include graphics, audio, and video.

16. The system of claim 15 further comprising a name element associated with one of the virtual graffiti boards, the system configured for accessing the virtual graffiti via the mobile device based on the name element.

17. The system of claim 15 further comprising an access control list associated with one of the virtual graffiti boards where access to the virtual graffiti via the mobile device is controlled, at least in part, based on the access control list.

* * * * *